United States Patent [19]

Galubensky et al.

[11] Patent Number: 4,783,115
[45] Date of Patent: Nov. 8, 1988

[54] MOTOR VEHICLE AIR DUCT SEAL

[75] Inventors: Edmund J. Galubensky, Romeo; Kenneth P. Adasek, Sterling Heights, both of Mich.

[73] Assignee: General Motors Corporation, Detroit, Mich.

[21] Appl. No.: 73,009

[22] Filed: Jul. 13, 1987

[51] Int. Cl.4 ............................. B60J 5/04; B60H 1/26
[52] U.S. Cl. .................................... 296/208; 296/146; 98/2.03; 98/2.04; 277/212 FB
[58] Field of Search ........................ 296/146, 166, 208; 98/2, 2.03, 2.04, 87; 277/212 FB; 105/18

[56] References Cited

U.S. PATENT DOCUMENTS

| | | | |
|---|---|---|---|
| 2,042,914 | 6/1936 | Trumpbour | 105/18 |
| 2,081,964 | 6/1937 | Tomlinson | 105/18 X |
| 2,133,488 | 10/1938 | Stearns | 98/2.04 |
| 2,150,110 | 3/1939 | Strauss et al. | 98/2.04 |
| 2,523,923 | 9/1950 | Rodert | 98/2.04 |
| 2,820,523 | 1/1958 | Earl | 98/2.06 X |
| 3,602,126 | 8/1971 | Breitschwerdt | 98/2.04 |

FOREIGN PATENT DOCUMENTS

| | | | |
|---|---|---|---|
| 3500359 | 2/1986 | Fed. Rep. of Germany | 296/146 |
| 3429687 | 2/1986 | Fed. Rep. of Germany | 296/146 |
| 3500358 | 7/1986 | Fed. Rep. of Germany | 296/146 |
| 38111 | 3/1984 | Japan | 98/2.04 |

*Primary Examiner*—Dennis H. Pedder
*Attorney, Agent, or Firm*—R. L. Phillips

[57] ABSTRACT

A motor vehicle has an air duct on a swinging door that aligns with and is sealingly joined to an air duct on the vehicle body when the door is closed by a collapsible leaf spring biased bellows seal mounted between the door and vehicle body.

1 Claim, 2 Drawing Sheets

MOTOR VEHICLE AIR DUCT SEAL

TECHNICAL FIELD

This invention relates to motor vehicle air duct seals and more particularly to those that sealingly join an air duct on a passenger compartment door to an air duct on the vehicle body.

BACKGROUND OF THE INVENTION

In motor vehicle heating, ventilating and air conditioning systems having an air duct on a passenger compartment door that connects with an air duct on the vehicle body when the door is closed to duct air to a rear seat area, typical practice is to employ a grommet type seal mounted between the door and the vehicle body to sealingly join the ducts when the door is closed. While this has proven generally satisfactory at the hinged edge of the door, there is a tendency for the grommet to be deflected out of position at the free edge of the door because of the pronounced sliding action of the door relative to the seal at the latter edge as compared with the relatively aligned sealing action at the former or hinged edge.

SUMMARY OF THE PRESENT INVENTION

The present invention avoids such a deflection problem with a leaf spring biased bellows that mounts between the door and the vehicle body for sealingly joining the ducts when the door is closed. The bellows is sealingly fixed at one of two opposite ends thereof to the vehicle body about the air duct thereon and a leaf spring fixed to the same end internal of the bellows operates to urge the other end of the bellows which is free into sealing engagement with the air duct on the vehicle body about the periphery thereof. The spring operates to maintain alignment of the free end of the bellows and apply uniform pressure to insure good tight sealing at this juncture of the ducts. Alternatively, the bellows seal may be fixed to the vehicle body with the leaf spring then biasing the free end of the bellows seal to seal against the air duct on the vehicle door. Moreover, while this seal arrangement is ideally suited for the free edge of the door, it is also applicable to provide sealing between the air ducts at the hinged edge of the door.

These and other objects, advantages and features of the present invention will become more apparent from the following description and drawing in which:

DESCRIPTION OF THE PREFERRED EMBODIMENT

Figure 1:
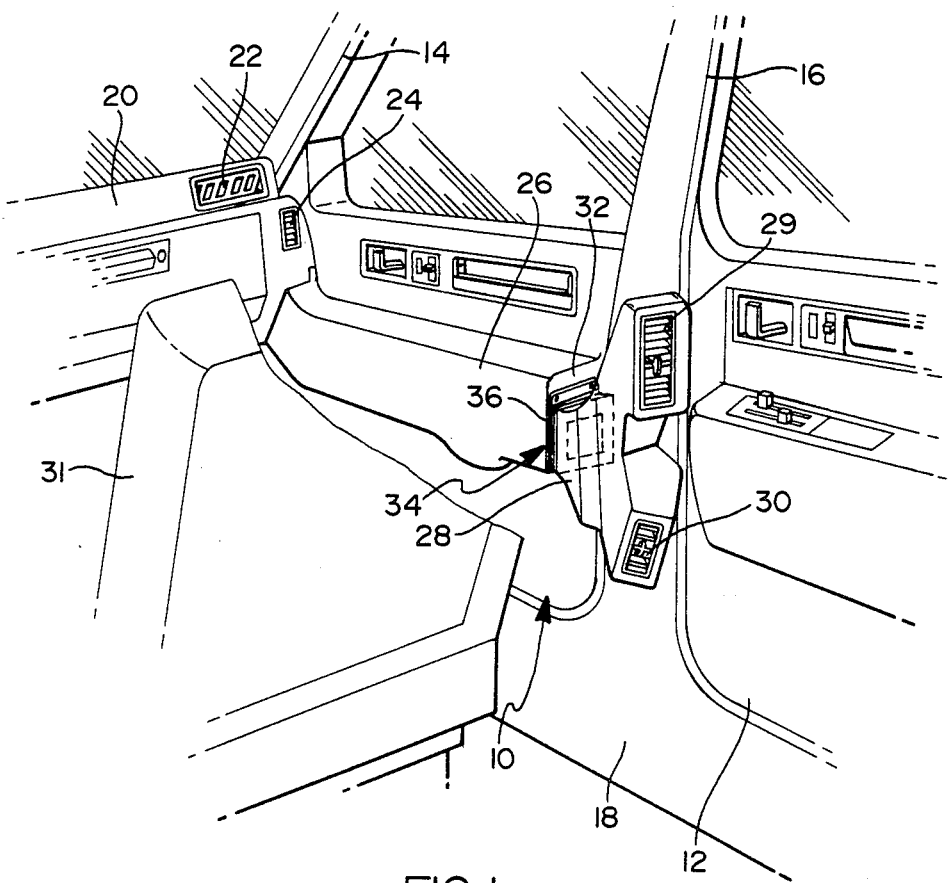
FIG. 1 is an isometric view of the right front corner of the passenger compartment of a motor vehicle having a sealed duct arrangement according to the present invention.

Referring to FIG. 1, front and rear doors 10 and 12 swingingly mounted in the respective door frames 14 and 16 of a vehicle body 18 access the front and rear of the passenger compartment on the right hand side and it will be understood that a similar arrangement is also provided on the left hand vehicle side. Temperature controlled air and also fresh outside air supplied from a conventional heating, ventilation and air conditioning unit (not shown) mounted forward of the instrument panel 20 is delivered to the passenger compartment through an air duct system. This system includes outlets 22 and 24 in the front of the compartment on the instrument panel and a duct 26 of rectangular cross section on the front door that connects to a rear delivery duct 28 on the vehicle body when this door is closed and also serves as an arm rest. The rear delivery duct 28 in turn delivers air to an upper outlet 29 and lower outlet 30 in the rear of the passenger compartment behind the front seat 31.

Figure 2:
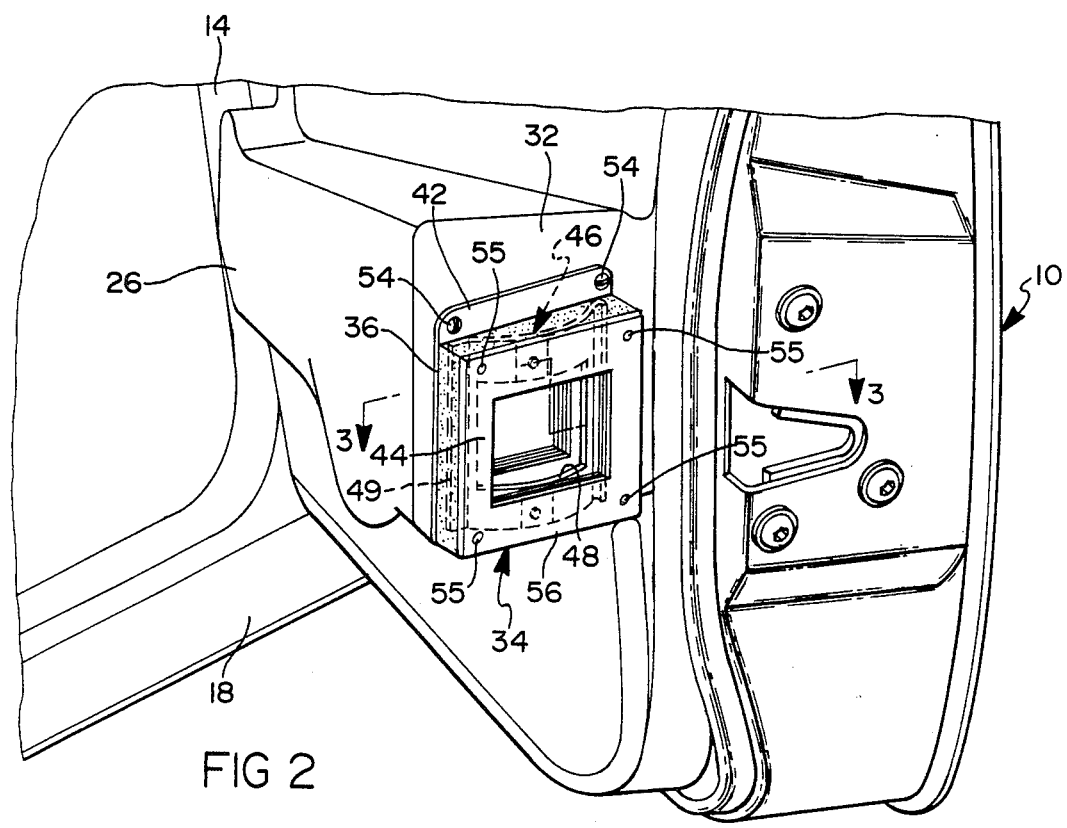
FIG. 2 is a view showing the right front door open and exposing the bellows seal thereon.

The front door 10 is hinged at its front edge on the door frame 14 and its free rear edge swings between the closed position shown in FIG. 1 and the open position shown in FIG. 2. As seen in FIGS. 1-4, the air duct 26 terminates at the free edge of the door with a vertical flat surface 32 to which a collapsible leaf spring biased bellows seal 34 according to the present invention is attached about the outlet 35 of this duct. The seal 34 comprises a bellows 36 that is made of pliable material such as that used to make an aircraft parachute and has two opposite ends 38 and 40 turned or folded inwardly that are each sandwiched between a pair of rectangular rings 42 and 44 respectively. A leaf spring 46 located internally of the bellows has a central opening 48 corresponding to that of the rings 42 and 44 and the ducts 26 and 28 and is connected at a base section 49 thereof to the inner one of the rings 42 by a pair of rivets 50 and is connected at the midpoint of each of its two leaf sections 51 to the inner one of the other rings 44 by a rivet 52. The oppositely located section 53 of the spring is curved and free to slide on the opposite side of the inner ring 42.

Figure 3:
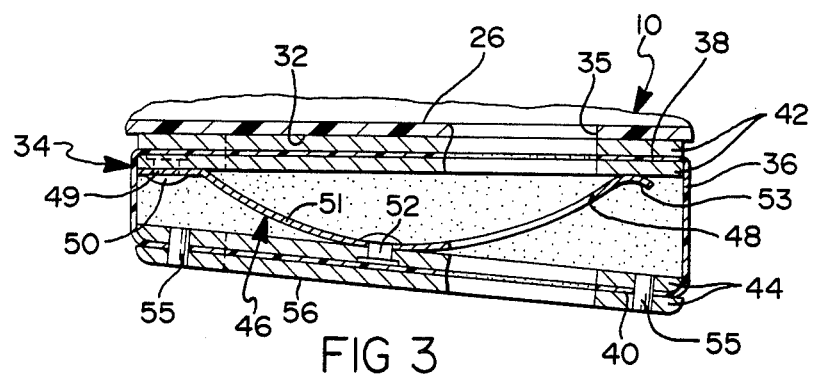
FIG. 3 is a view taken along the line 3—3 in FIG. 2.
Figure 4:
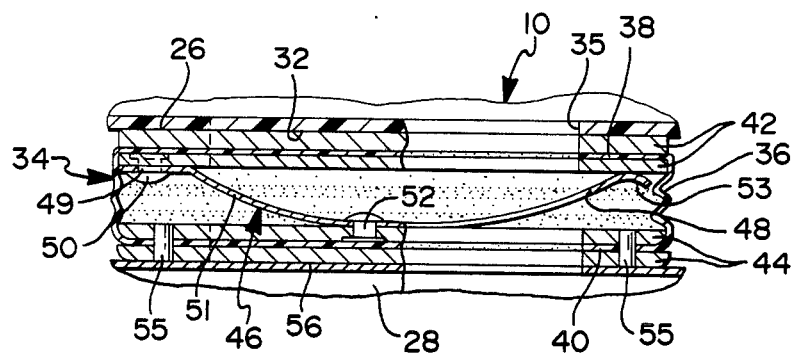
FIG. 4 is a view similar to FIG. 3 but showing the bellows seal with the door closed.
Figure 5:
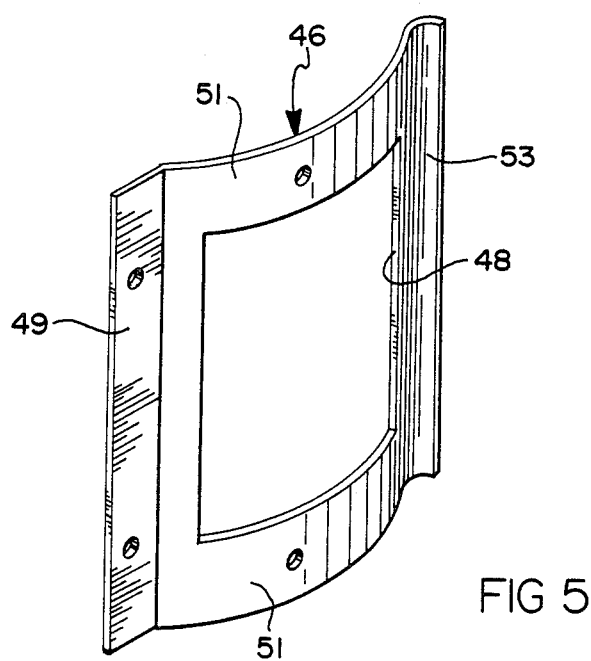
FIG. 5 is an isometric view of the leaf spring used in the bellows seal.

The one pair of rings 42 with the bellows end 38 sandwiched therebetween are connected by bolts 54 to the terminal end 32 of the air duct 26 on the door and the other pair of rings 44 with the other bellows end 40 sandwiched are fixed together by flush rivets 55 and with the door in the open position as shown in FIGS. 2 and 3, the leaf spring 46 normally holds the bellows and attached outer sealing ring 44 fully extended with the latter slightly angled inwardly toward the door opening for sliding engagement with the inlet of the rear duct 28. On closure of the door, the angled seal face 56 of the outer ring 44 slides across the inlet of the rear duct gradually collapsing the bellows until the door closes. The leaf spring 46 maintains the seal face 56 in alignment while the bellows contracts such that in the closed position as seen in FIG. 4, the seal is aligned with the duct on the vehicle body and applies a uniform sealing pressure thereabout to maintain a tightly sealed coupling joining the ducts 26 and 28.

Having described the seal arrangement at the free end of the door, it will also be understood that a grommet might be used at the hinged door edge if seal deflection is not a problem or a seal like that just described may be employed. Furthermore, it will be appreciated that the seal may be mounted on the vehicle body and seal against the air duct on the door as the latter is moved with the door to its closed position. And thus, the above described preferred embodiment is intended to be illustrative of the invention which may be modified within the scope of the appended claim.

The embodiments of the invention in which an exclusive property or privilege is claimed are defined as follows:

1. A motor vehicle having a door swingingly mounted on a vehicle body, an air duct on said door that aligns with an air duct on said vehicle body when the door is closed, and collapsible leaf spring biased seal means mounted between said door and vehicle body for sealingly joining said ducts when the door is closed, said seal means comprising a bellows that is sealingly fixed at one of two opposite ends thereof to said door about the air duct thereon, a leaf spring fixed to said door internal of said bellows and operative to urge the other end of the bellows toward sealing engagement with the air duct on the vehicle body, and said other end of said bellows having seal face means disposed obliquely to said one end with said door opened for slidably contacting said air duct on the vehicle body so as to gradually collapse said bellows as the door closes.

* * * * *